United States Patent Office 3,440,826
Patented Apr. 29, 1969

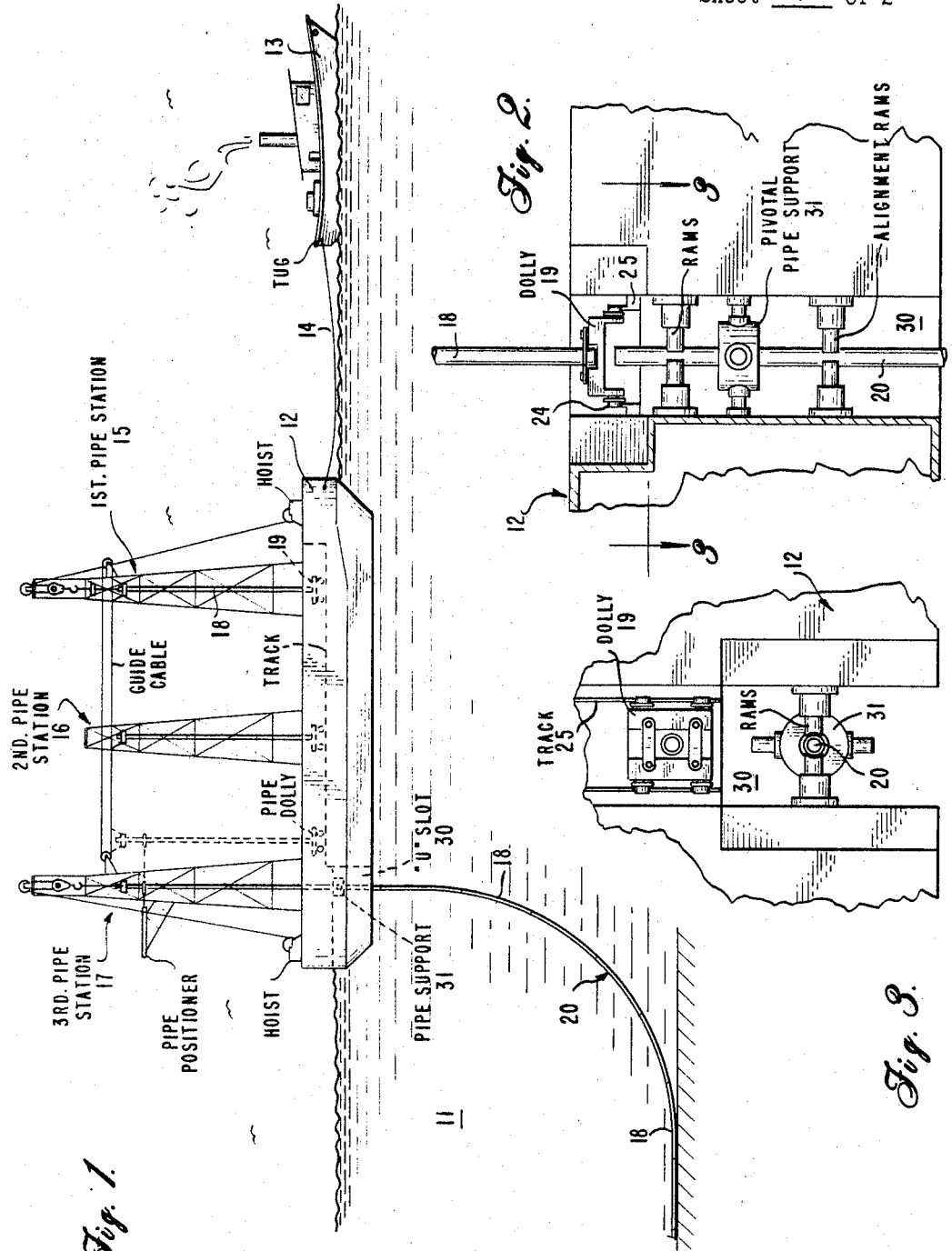

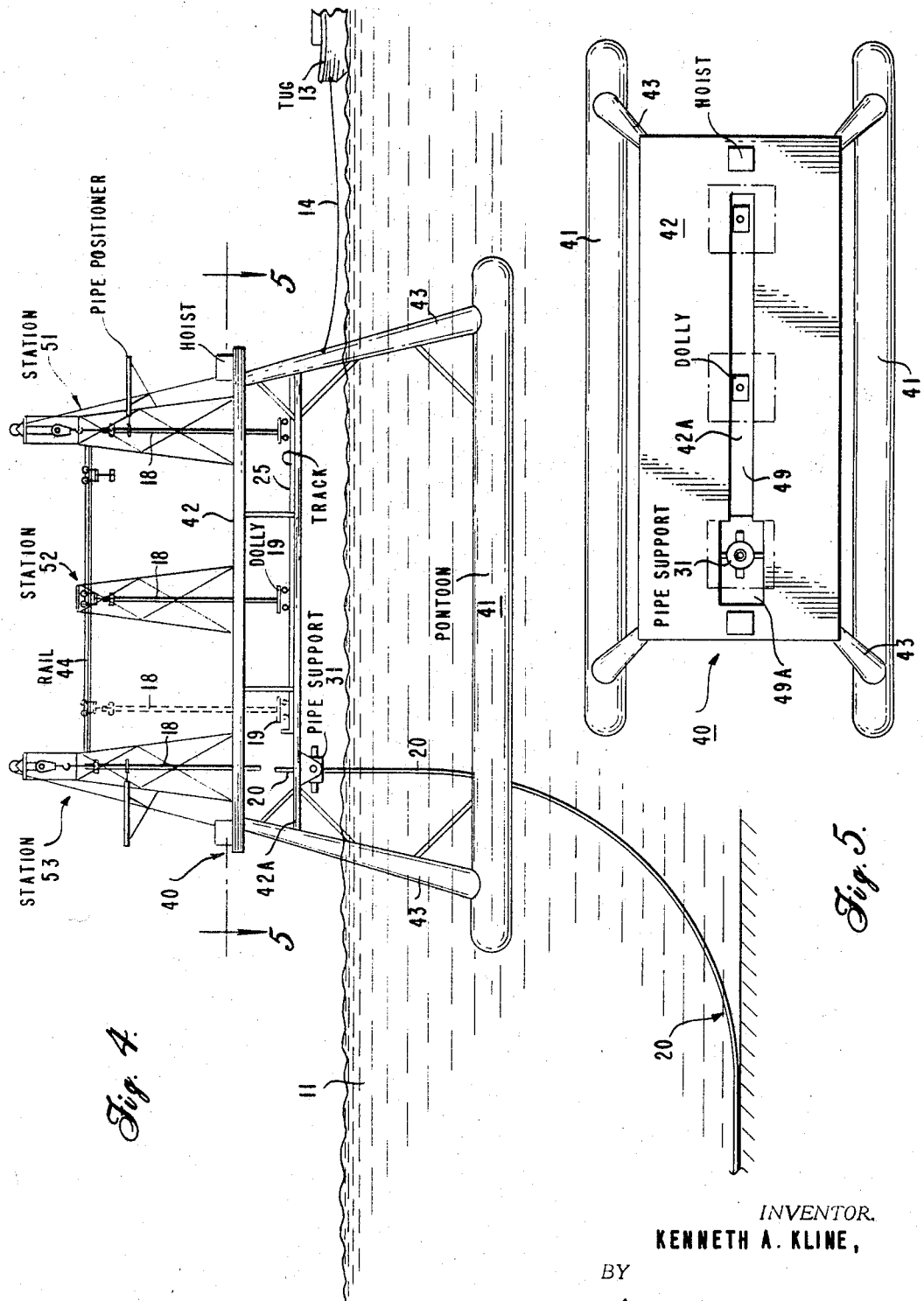

3,440,826
LAYING PIPE IN WATER
Kenneth A. Kline, Harper Woods, Mich., assignor to Esso Production Research Company, a corporation of Delaware
Filed Jan. 3, 1967, Ser. No. 606,959
Int. Cl. B63b 35/04; F16l 1/00
U.S. Cl. 61—72.3   11 Claims

ABSTRACT OF THE DISCLOSURE

Pipe is lowered in a supported vertical position from a floating vessel in a body of water, the length of the pipe being increased by joining sections to its supported vertical aspect as the pipe is lowered to water bottom and as the vessel is moved in a selected direction.

BACKGROUND OF THE INVENTION

Field of the invention

The present invention is directed to a method for laying pipe in a body of water. More particularly, the invention is concerned with laying pipe in a body of water from a floating vessel. In its more specific aspects, the invention is concerned with laying pipe in a body of water while avoiding the formation of S-bends in the pipe.

DESCRIPTION OF THE PRIOR ART

Heretofore, pipe has been laid in a body of water by arranging it on a vessel which is moved in a selected direction as the pipe leaves the vessel angularly which causes stresses due to the curvature introduced into the pipe. Stingers or guides have been used to support the pipe leaving the stern or side of vessel but curvature is still a problem. In accordance with the present invention, curvature problems are minimized.

SUMMARY OF THE INVENTION

The present invention may be briefly described as a method for laying pipe in a body of water in which a vertical length of pipe is arranged on a vessel floating in a body of water. The length of the pipe is increased while maintaining it on the vessel in a vertical position. Thereafter, the vertically maintained pipe is lowered from the vessel to water bottom while maintaining a substantially vertical aspect and while moving the vessel in a body of water in a selected direction. The length of the pipe is continuously increased on the vessel while maintaining it in a vertical position as the pipe is supportingly lowered in a vertical position until the pipe has been laid on water bottom to extend in the selected direction.

In accordance with the present invention, the length of pipe is increased on the vessel by sealingly connecting sections of the pipe together such as by welding or by threadedly connecting the pipe sections. In that a more or less permanent connection is desired, it would be preferable to weld the pipe sections together.

The lowered pipe is suspended or supported vertically from the vessel as additional vertical lengths of pipe are sealingly connected to the suspended pipe. During the connection of additional vertical lengths of pipe to the suspended pipe, it is important in the practice of the present invention that vertical lengths of pipe be moved horizontally on the vessel for connection to the lowered pipe as the vessel is moved in the selected direction. Thus, in accordance with the present invention, the vertical lengths of pipe are guidingly moved horizontally for sealing connection to the lowered pipe. The pipe is also supported as it is lowered vertically. This is suitably accomplished, for example, by employing a crane or block and tackle arrangement. Pipe elevators such as used on drilling rigs may also be employed to support the pipe as it is vertically lowered. Likewise, pneumatic or hydraulic gripping devices may be used to support the pipe as it is being lowered vertically. For example, hydraulic or pneumatic jacking devices such as used on self-elevating mobile drilling rigs may be used for this purpose.

In order to compensate for horizontal movement of the vessel and the rise and fall of the vessel due to wave and wind action, it is desirable in the practice of the present invention to pivotally suspend the pipe from the vessel as it is being lowered into deep water by a gimballed or pivotal connection which will allow some movement in each direction of the pipe relative to the vessel. It is also advantageous to use a gimballed or pivotal connection since this allows pipe to be easily lowered in shallow water as well as deep water. It is desirable to have large diameter pipe leave the lay barge or vessel in a vertical position making a rather small angle with the horizontal and the gimballed or pivotal connection allows this to be done especially where large diameter, such as 16 inch, pipe is being lowered in say 200 feet of water. Without the pivotal connection, this would be difficult.

Since the pipe is exposed to water of various salinities and to various environmental conditions, the exterior surface of the pipe may be subject to corrosion. In the practice of the present invention, it is desirable to provide a coating on the exterior of the pipe to protect same from the elements to which it is exposed. Ordinarily, the pipe is received from the manfacturer with a protective coating but during connection of sections of the pipe on the vessel, the connections may have the coatings disrupted or destroyed and, accordingly, it is desirable prior to lowering the pipe to coat at least the connections to provide a protective coating. Such coatings are well known and further description herein is not needed.

BRIEF DESCRIPTION OF THE DRAWING

The present invention will be further illustrated by reference to the drawing in which FIGURE 1 is a diagrammatic showing of laying pipe in accordance with the present invention wherein the lay barge is moved in a selected direction as the pipe is lowered;

FIGURE 2 is a fragmentary view of the stern of the barge of FIGURE 1;

FIGURE 3 is a view taken along the line 3—3 of FIGURE 2; and

FIGURES 4 and 5 illustrate another embodiment which is usable in the practice of the present invention.

DESCRIPTION OF THE PREFERRED EMBODIMENTS IN CONJUNCTION WITH THE DRAWING

Referring now to FIGURES 1-3 in which identical numerals will designate identical parts, numeral 11 designates a body of water in which a lay barge 12 is floatingly arranged which is being towed by tug 13 connected to it by cable 14. The lay barge 12 is provided with a plurality, in this particular instance 3, support structures 15, 16 and 17. While three support structures have been shown, it will be understood that a greater or lesser number may be used. Arranged in support structure 15 is a vertical length of pipe 18 which is resting on a movable dolly 19. The vertical length of pipe 18 may be made up progressively in support structures 15, 16 and 17 and moved from right to left as from station 15 to 16 prior to lowering same from the support structure 17, the pipeline 20 being suspended by means which will be described further. Of course, it will be realized that the pipeline 20 is made up of sections 18 as illustrated in FIGURE 1.

From FIGURE 1, it will be noted that the pipeline 20 has only one bend in it, the bend from the lay barge 12 to water bottom 21 and does not describe an S-curve as usually is encountered when a pipe is lowered horizontally from a lay barge.

Referring to FIGURES 2 and 3, the dolly 19 is provided with a recess 22 which is designed to loosely receive the pipe section 18 but is held in sufficient confinement by straps 22A to hold the pipe section 18 in an upright position while the upper end of the pipe section 18 is suspended from the support structures 15, 16 and 17 by pipe elevators suspended from a guide cable 10, which is movable on pulleys as shown. It will be noted that the dolly 19 is provided with rollers 24 which engage and roll on track 25. Other propulsion means may be employed; for example, the dolly 19 may be movable by chains or endless conveyors and the like. The rollers 24 are shown only for illustration purposes and are not to be construed as limiting the invention to the particular embodiment.

The track 25 terminates at a U-shaped slot or opening 30 in the stern of the barge 12. As will be seen, the station structure 17 is positioned directly over the opening 30. Positioned in opening 30 is a hydraulic slip containing pipe support member 31 which is pivotally mounted to the barge 12 and adapted to receive and support the upper end of pipeline 20. Also positioned in slot 30 are vertically spaced-apart pairs of pipe rams which are coaxially aligned above and below the pipe support 31. The rams align the pipe 20 projecting through and held by the support member 31, whereby the pipe 18 in station 17 can be connected to the upper end of pipe 20.

Stations 15 and 17 are provided with pipe hoisting means as shown. Joints of pipe 18 are aligned and connected together in station 15 and then suspended or connected on the guide cable, for movement to the next station 16 and from there to station 17 where the final connection is made to pipeline 20. When the pipe in station 17 is connected to line 20, it is then lowered into the water through the support member 31, a distance equal to the length of pipe 18. As the pipe is lowered, the tow tug moves the barge forward at a speed sufficient to maintain the desired curve in the pipeline 20 as shown in FIGURE 1.

The pipe positioner means shown in FIGURE 1 in station structure 17 operates to engage the pipe 18 when it is in the position shown in dotted lines adjacent station 17 and pulls it into the structure for engagement with the hoisting means therein. The pipe 18 is then picked up off of dolly 19 and swung into alignment with the upper end of pipeline 20.

In FIGURES 4 and 5, a different type of lay barge is employed from that described in FIGURES 1–3. In this particular instance, a floating platform-type structure, indicated by the numreal 40, is supported by pontoon members 41 connected to the platform 42 by upright members 43 which suitably may be cross-braced as desired to provide rigidity. A lower platform 42A is also provided. Arranged on platform 42 and straddling a slot 49 are station structures 51, 52 and 53 which are similar to that of FIGURE 1.

As shown, the slot 49 runs substantially the length of the platform 42 and ends in an enlarged opening 49A at the stern of barge 40. The lower platform 42A is also provided with an opening similar to and positioned directly below the opening 49A. Pipe support means 31 are also provided. A dolly track 25 is positioned on platform 42A and extends to the opening in platform 42A. The pipe sections are assembled and positioned on dolly members 19 and guided by rail guide member 44 to the next station and subsequently to station 53 where they are connected into the upwardly projecting end of pipeline 20.

The embodiment of FIGURE 5 is desirable for use in relatively deep water where heavy seas may be a problem since stability is imparted to the structure by the pontoons 41 which may be submerged to a depth sufficiently below wave and wind action.

In the practice of the present invention, it is to be understood that the vertical lengths of pipe may be made up on the lay barge or platform, as the case may be, and then raised to a vertical position and supported in a vertical position from the various support structures as the pipe is moved horizontally along the lay barge.

The present invention is quite useful in laying pipelines to service offshore oil and gas fields since it is desirable in laying such pipelines to minimize stresses introduced in the pipe and the protective coatings therefor so as to eliminate or minimize deformation of the pipe and pipe coatings. In accordance with the present invention, these objectionable effects are avoided by controlling the curvature during the laying operation where conventional laying operations involve laying the pipe from a barge such that the pipe assumes the shape of the letter S.

The present invention involves laying the pipe such that there is only one large curve in the pipe. Since the curve is of a large radius, there is little or no deformation of the pipe or of the pipe coating. This is quite advantageous and useful.

Another advantage of the present invention is that all connections are made at the water surface and it is not necessary to endanger the life or health of personnel by using divers.

While the present invention has been illustrated by use of a tug to provide propulsion of the lay barge, it is to be understood that the lay barge may be anchored at a distance from its particular position and moved toward the anchored position by use of winches and the like.

The nature and objects of the present invention having been completely described and illustrated, and the best mode and embodiment set forth, what I wish to claim as new and useful and secure by Letters Patent is:

1. A method for laying pipe from a vessel in a body of water having a pipe line vertically suspended therefrom at a free end which comprises:
   arranging at least a vertical length of pipe at at least a first station on said vessel horizontally spaced on said vessel from the suspended pipe line;
   guidingly moving said vertical length of pipe horizontally over the free end of said vertically suspended pipe line at at least a second station;
   sealingly connecting said vertical length of pipe to said free end of said pipe line;
   lowering said pipe line to water bottom while maintaining it in a substantially vertical position as it is lowered vertically from said vessel; and
   moving said vessel in said body of water in a selected direction as said pipe line is lowered to water bottom.

2. A method in accordance with claim 1 in which a protective coating is applied to at least a portion of the surface of said pipe prior to vertically lowering said pipe.

3. A method in accordance with claim 1 in which the pipe is pivotally suspended from said vessel as it is being lowered.

4. A method in accordance with claim 1 in which the pipe is supportingly lowered in a substantially vertical position.

5. A method in accordance with claim 1 in which vertical lengths of pipe are horizontally moved from a first to a second and to a third station as said pipe line is lowered to water bottom.

6. A method in accordance with claim 1 in which the vertical lengths of pipe are moved horizontally while supporting same at both ends thereof.

7. Apparatus for laying pipe in a body of water which comprises:
   a vessel floatingly arranged on said water and adapted to be moved in a selected direction;
   means for maintaining at least a vertical length of pipe in a substantially vertical position on said vessel;

means on said vessel for supportingly lowering said vertical length of pipe from said vessel in said substantially vertical position;

means on said vessel for sealingly connecting additional vertical lengths of pipe to the lowered vertical length of pipe; and a plurality of horizontally spaced apart means for moving said additional vertical lengths of pipe horizontally on said vessel for connection to the lowered vertical length as said vessel is moved in said selected direction.

8. Apparatus in accordance with claim 7 in which said vertical length of pipe is pivotally suspended as it is supportingly lowered from said vessel.

9. Apparatus in accordance with claim 7 in which said horizontally spaced apart means comprise:
   (a) suspension means; and
   (b) a dolly arranged for horizontal movement on said vessel and for supporting the lower end of said vertical length of pipe.

10. Apparatus in accordance with claim 9 in which means are provided for moving said dolly.

11. Apparatus in accordance with claim 7 in which said vessel is provided with a track on which said dolly is movably arranged.

References Cited

UNITED STATES PATENTS

| 2,527,255 | 10/1950 | Hunt | 175—85 X |
| 2,910,835 | 11/1959 | Timothy | 61—72.3 |
| 3,025,918 | 3/1962 | Leven | 175—85 X |
| 3,266,256 | 8/1966 | Postlewaite et al. | 61—72.3 |
| 3,286,777 | 11/1966 | Gyongyosi | 175—85 X |
| 3,331,212 | 7/1967 | Cox et al. | 61—72.3 |

EARL J. WITMER, *Primary Examiner.*